(12) United States Patent
Beverly et al.

(10) Patent No.: US 8,588,064 B2
(45) Date of Patent: Nov. 19, 2013

(54) TRANSPORT LAYER THAT WARNS APPLICATION OF POTENTIAL BOTTLENECK AND METHODS THEREOF

(75) Inventors: Harlan T. Beverly, McDade, TX (US); Charles A. Musta, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/355,536

(22) Filed: Jan. 16, 2009

(65) Prior Publication Data

US 2009/0185488 A1    Jul. 23, 2009

Related U.S. Application Data

(60) Provisional application No. 61/021,890, filed on Jan. 17, 2008.

(51) Int. Cl.
*H04L 29/10* (2006.01)
*H04L 12/56* (2011.01)

(52) U.S. Cl.
CPC .................................. *H04L 47/10* (2013.01)
USPC ............................... 370/230; 709/230

(58) Field of Classification Search
CPC ............................. H04L 47/10; H04L 47/193
USPC ............................. 370/229–235; 709/230–235
See application file for complete search history.

(56) References Cited

U.S. PATENT DOCUMENTS

| | | | |
|---|---|---|---|
| 5,892,754 A * | 4/1999 | Kompella et al. | 370/236 |
| 6,320,846 B1 * | 11/2001 | Jamp et al. | 370/235 |
| 6,490,251 B2 * | 12/2002 | Yin et al. | 370/236.1 |
| 6,851,008 B2 * | 2/2005 | Hao | 710/305 |
| 6,975,876 B1 | 12/2005 | Cast et al. | |
| 2003/0236827 A1 * | 12/2003 | Patel et al. | 709/203 |
| 2004/0205231 A1 * | 10/2004 | Clarke et al. | 709/237 |
| 2004/0218617 A1 | 11/2004 | Sagfors | |
| 2005/0021804 A1 | 1/2005 | Hameleers et al. | |
| 2005/0120090 A1 * | 6/2005 | Kamiya | 709/213 |

(Continued)

FOREIGN PATENT DOCUMENTS

| WO | 0013442 A1 | 3/2000 |
|---|---|---|
| WO | 2007091941 A1 | 8/2007 |

OTHER PUBLICATIONS

International Search Report for PCT/US09/31286 dated Mar. 10, 2009, 2 pages.

(Continued)

*Primary Examiner* — Kibrom T Hailu
*Assistant Examiner* — Benjamin Lamont
(74) *Attorney, Agent, or Firm* — DeLizio Gilliam, PLLC (57) ABSTRACT

A method of managing communication of messages via a network includes storing messages received from an application in a queue at a transport layer. The transport layer monitors the amount of information stored at the queue. When the amount of information exceeds a threshold amount, the transport layer provides a warning message to the application. In an embodiment, the transport layer provides the warning message before the queue assigned to store messages from the application is full, so that the application can continue to provide messages to the transport layer after the warning message. The application can take appropriate action in response to the message, such as reducing the amount or frequency of information provided at the transport layer, thereby reducing the likelihood of a communication bottleneck at the transport layer.

22 Claims, 6 Drawing Sheets

(56) References Cited

U.S. PATENT DOCUMENTS

2006/0248582 A1* 11/2006 Panjwani et al. ............... 726/13
2007/0025255 A1* 2/2007 Noble ........................... 370/235
2007/0223379 A1* 9/2007 Sivakumar et al. ........... 370/235
2008/0181108 A1* 7/2008 Hashmi et al. ................ 370/231

OTHER PUBLICATIONS

Supplementary European Search Report mailed Jan. 11, 2011 for EP Application No. 09 07 2989, 6 pages.

* cited by examiner

TRANSPORT LAYER THAT WARNS APPLICATION OF POTENTIAL BOTTLENECK AND METHODS THEREOF

CROSS-REFERENCE TO RELATED APPLICATION(S)

This application claims priority to U.S. Provisional Patent Application No. 61/021,890, entitled "Method For Exerting Back Pressure on Network Applications Via Predefined Transmission Backlog Thresholds" filed on Jan. 17, 2008, which is assigned to the current assignee hereof and is incorporated herein by reference in its entirety.

BACKGROUND

1. Field of the Disclosure

The present disclosure relates to network communication, and more particularly to management of communication flow between electronic devices.

2. Description of the Related Art

In network communication, such as communication between peers in a peer-to-peer network, an application at a source communication node sends messages to a destination node via a network layer. In one configuration, the application provides each message to a transport layer, which parses each message into a set of packets, and provides the packets to the network layer for communication to the destination node. The transport layer thus provides a layer of abstraction for the application, so that the application does not have to manage packet communications with the destination node.

However, the transport layer typically has a limited number of resources, such as memory resources, to prepare and communicate packets. This can become problematic when the messages are provided by the application much more quickly than packets can be reliably communicated by the transport layer. For example, if the transport layer is implementing an ordered communication protocol, such as TCP/IP, the transport layer typically stores a transmitted packet in a queue until an acknowledgement is received from the destination node indicating that the packet has been properly received at the destination node, thereby allowing the transport layer to retire the packet from the queue. The queue is typically limited in size, so that if the application provides messages such that packets cannot be retired quickly enough, a bottleneck can result, causing loss of packets or other communication problems. The bottleneck problem can be addressed by having the application set the rate of communications of messages at a fixed rate that is known to avoid bottleneck of the queue. However, this can result in underutilization of resources at the transport layer.

BRIEF DESCRIPTION OF THE DRAWINGS

The present disclosure may be better understood, and its numerous features and advantages made apparent to those skilled in the art by referencing the accompanying drawings.

DETAILED DESCRIPTION

A method of managing communication of messages via a network includes storing messages received from an application in a queue at a transport layer. The transport layer monitors the amount of information stored at the queue. When the amount of information exceeds a threshold amount, the transport layer provides a warning message to the application. In an embodiment, the transport layer provides the warning message before the queue assigned to store messages from the application is full, so that the application can continue to provide messages to the transport layer after the warning message. The application can take appropriate action in response to the message, such as reducing the amount or frequency of information provided at the transport layer, thereby reducing the likelihood of a communication bottleneck at the transport layer.

Figure 1:
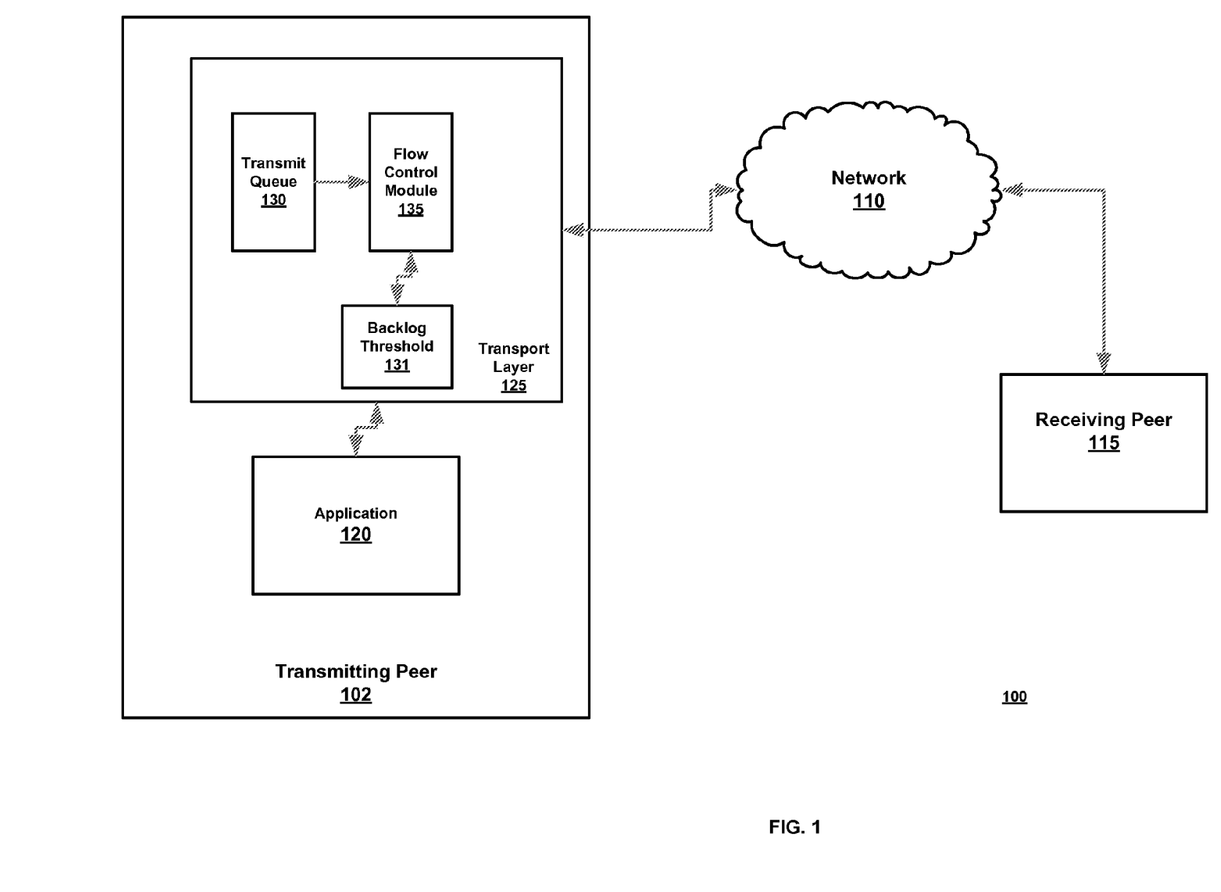
FIG. 1 is a block diagram of a communications network in accordance with one embodiment of the present disclosure.

Referring to FIG. 1, a block diagram of a particular embodiment of a communications network 100 is illustrated. The communications network 100 includes a transmitting peer 102, a network 110, and a receiving peer 115. The transmitting peer 102 and receiving peer are each connected to the network 110. It will be appreciated that the transmitting peer 102 and receiving peer 115 are referred to as transmitting and receiving for illustrative purposes, and each peer can both transmit and receive information via the network 110. Thus, receiving peer 115 can also transmit messages to transmitting peer 102, which can receive the transmitted messages. It will further be appreciated that, although for purposes of discussion transmitting peer 102 and receiving peer 115 are illustrated as communication nodes in a peer to peer network, in other embodiments the peers can be arranged in a client server fashion. In addition, the transmitting peer 102 and receiving peer 115 are sometimes referred to as "nodes" or "communication nodes." As used herein a node refers to an electronic device in a network that is able to receive, transmit, or route a communication message. The node that receives a message is referred to as the target node of the message, while the node that creates and transmits the message is referred to as the source node. For purposes of discussion herein, it is assumed that network 110 is a wide-area packet-switched network, such as the Internet.

Transmitting peer 102 includes an application 120 and a transport layer 125. The application 120 is a software application embodied on a computer readable medium including instructions to manipulate a processor in order to execute specified tasks. One such task includes creating messages for communication to receiving peer 115. In particular, in response to specified conditions, such as a user input, request from another application, or other condition, the application 120 can create one or more messages including one or more data payloads for communication to receiving peer 115. The application 120 provides the messages to the transport layer 125 for communication via the network 110.

The transport layer 125 is configured to receive messages from the application 120 and form packets based on the messages. The transport layer 125 then provides the packets to the network 110 for communication to the target node for each packet. In an embodiment, the transport layer 125 can provide each packet to another communication layer, such as a logical or physical communication layer, for provision to the network 110.

The transport layer 125 includes a transmit queue 130, which is configured to store each packet that has been provided to the network 110 for communication. The transport layer 125 awaits an acknowledgement message for each packet from the target node of each packet and, in response to receiving the acknowledgement message, retires the packet from the transmit queue 130. If the transport layer receives an warning message associated with a particular packet from the target node of that packet, the transport layer 125 can retransmit the packet. The transmit queue 130 thereby improves the reliability of communications with target nodes.

This can be better understood with reference to an example. The transport layer 125 can receive messages from application 120 targeted to receiving peer 115. In response, the transport layer 125 forms packets including the data payloads of the received messages. The transport layer provides each packet to the network 110 for communication to the receiving peer 115. In addition, the transport layer stores each packet at the transmit queue 130.

The receiving peer 115 monitors the network 110 for packets targeted to the peer. In response to receiving such a packet, the receiving peer stores the packet at a local queue (not shown). For each packet received, the receiving peer 115 sends an acknowledgement message to the source node via the network 110. The receiving peer can also monitor received packets to determine if an expected packet has not been received. For example, if packets are being communicated to the receiving peer 115 according to an ordered protocol, the transport layer at the receiving peer 115 can determine that an packet expected in the order has not been received. In response, the receiving peer 115 can communicate an warning message to indicate the expected packet has not been received.

The transport layer 125 receives the acknowledgment messages and warning messages provided by the receiving peer 115. In response to receiving an acknowledgment message, the transport layer 125 retires the packet associated with the acknowledgement message from the transmit queue 130, thereby freeing space in the queue. In response to receiving an warning message, the transport layer 125 retransmits the packet associated with the warning message.

The transport layer 125 includes a flow control module 135 that monitors the amount of unretired data that has been communicated to the receiving node 115. That is, the flow control module 135 monitors the amount of data associated with packets at the transmit queue 130. The amount of unretired data communicated to a target node is referred to for purposes of discussion as the "backlog" for the target node. The flow control module 130 compares the amount of backlog to a backlog threshold 131. If the amount of backlog exceeds the backlog threshold, the flow control module 130 can communicate an warning message to the application 120. In response to receiving the warning message, the application 120 can take appropriate action, such as throttling (e.g. reducing) the rate at which messages targeted to the receiving peer 115 are communicated to the transport layer. The flow control module 135 thereby reduces the likelihood of a communication bottleneck at the transport layer 125 or the receiving peer 115. As used herein, a communication bottleneck refers to a situation at the transport layer 125 where the layer is unable to communicate messages quickly enough so that layer resources, such as memory, reach a defined or programmable threshold.

The backlog threshold 131 indicates an amount of available resources, such as memory space, at the transport layer 125 or the receiving peer 115. In an embodiment, the backlog threshold 131 is set so that the flow control module communicates an warning message before the amount of available resources indicated by the threshold is exhausted. For example, the backlog threshold 131 can be set so that a warning message is communicated before the transmit queue 130 is full. This reduces the likelihood of a bottleneck at the queue. In particular, the transport layer can continue to receive messages from the application 120 after the warning message is communicated, as resources are still available to store the messages.

In one embodiment, the backlog threshold 131 can be a programmable value that is set based on a request from the application 120. In another embodiment, the backlog threshold 131 is set based on a request from the receiving peer 115. For example, during negotiation of a communication session, the receiving peer 115 can determine an amount of resources, such as memory, available for communications from the transmitting peer 102. Based on the amount of resources, the receiving peer 115 requests the backlog threshold be set to a value that reduces the likelihood of a communication bottleneck at the receiving peer 115.

Accordingly, as discussed above and further herein, the communication flow, such as the rate of messages being provided by the application 120, is managed or influenced at the transport layer 125. This allows for a reduced likelihood of communication bottleneck without the application 120 having to monitor communication overhead. This can provide for simplification of the application 120, as well as increased communication bandwidth. Further, this allows for a reduced use of memory resources and computer cycles for the application 120. For example, in response to an indication from the flow control module 135 that the threshold has been reached, the application 120, or a processor executing the application 120, can enter a low power mode for a defined amount of time, rather than continue to attempt to send messages via transport layer 125. The power consumption of peer 402 can thereby be reduced.

Figure 2:
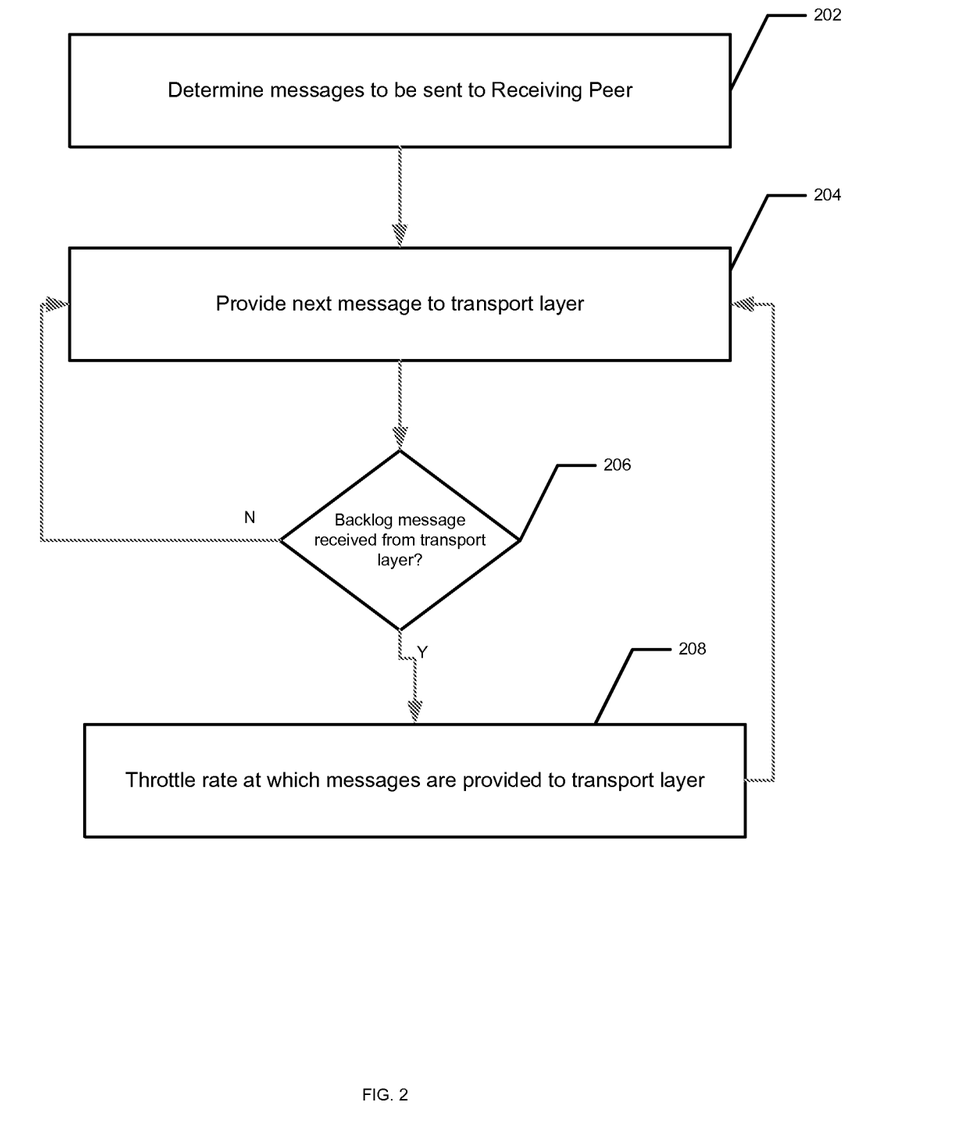
FIG. 2 is a flow diagram of a method of providing messages from an application to a transport layer in accordance with one embodiment of the present disclosure.
Figure 3:
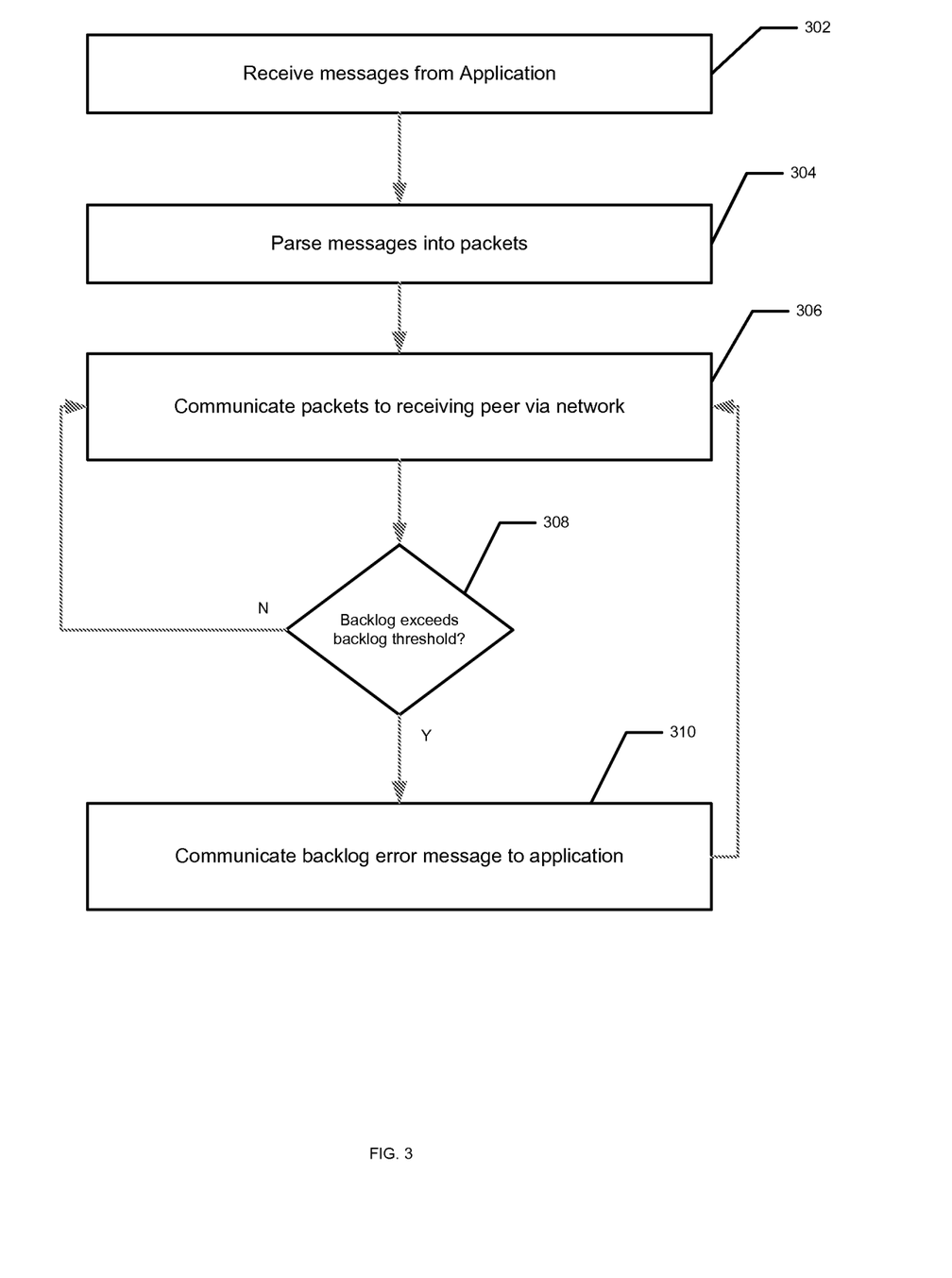
FIG. 3 is a method of managing the flow of messages provided from an application to a transport layer in accordance with one embodiment of the present disclosure.

The operation of the communication network 100 can be better understood with reference to FIGS. 2 and 3. FIG. 2 illustrates a flow diagram of a particular embodiment of a method of communicating messages by the application 120. At block 202, the application 120 determines messages to be sent to the receiving peer 115. At block 204, the application 120 provides the next message to be sent to the transport layer 125. At block 206, the application 120 determines if a backlog warning message has been received from the flow control module 135. If not, method flow returns to block 204 and the application 120 provides the next message to the transport layer 125 at the present communication rate. If a backlog warning message has been received, the method flow moves to block 208 and the application 120 adjusts (throttles) the rate at which messages are provided to the transport layer 125. For example, the application 120 can delay providing messages to the transport layer 125 for a programmable or defined amount of time. The method flow moves to block 204 and the application 120 provides the next message at the new communication rate. Thus, the application 120 adjusts the rate at which it provides messages to the transport layer 125 based on warning messages received from the layer, thereby reducing the chance of communication bottleneck.

FIG. 3 illustrates a flow diagram of a particular embodiment of a method of communicating packets at the transport layer 125. At block 302, the transport layer 125 receives a message from the application 120. In response, at block 304, the transport layer 125 parses the received message into one or more packets for communication via the network 110. At block 306, the transport layer 125 communicates the packets to the network 110, and stores the communicated packets at the transmit queue 130. At block 308, the flow control module 135 determines if the backlog exceeds the backlog threshold. If not, the method flow returns to block 306. If so, the method flow moves to block 310 and the transport layer 125 communicates a backlog warning message to the application 120. The transport layer 125 thus provides backpressure for messages from the application 120 via the backlog warning messages.

Figure 4:
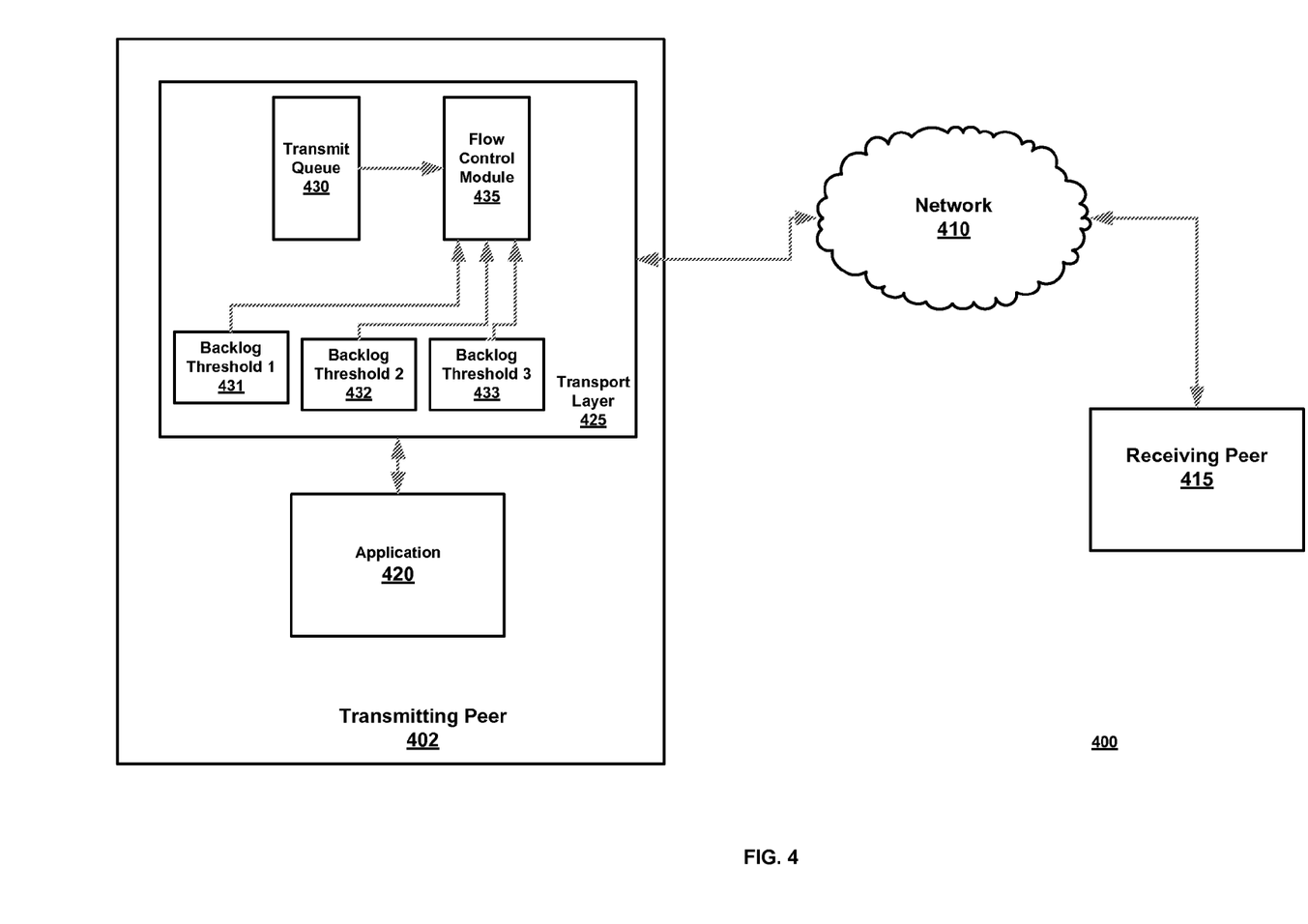
FIG. 4 is a block diagram of a communication network in accordance with another embodiment of the present disclosure.

FIG. 4 illustrates a communication network 400 in accordance with one embodiment of the present disclosure. The communication network 400 includes a transmitting peer 402, a network 410, and a receiving peer 415, each of which is connected and configured similarly to the corresponding items of FIG. 1. The transport layer 425 of the transmitting peer 402 includes multiple backlog thresholds, including backlog threshold 431, backlog threshold 432, and backlog threshold 433. Each of these backlog thresholds stores a different threshold value. The flow control module 435 can compare the amount of backlog associated with receiving peer 415 to each of the backlog thresholds 431-433 and, based on the comparison, determine whether a backlog warning message should be communicated to the application 420. In an embodiment, the transport layer 425 can communicate a different warning message in response to each of the backlog thresholds 431-433 being exceeded. For example, in one embodiment the backlog thresholds 431-433 include progressively larger values, with backlog threshold 431 having the smallest value. In response to determining that the amount of backlog exceeds backlog threshold 431, the transport layer 425 can provide a backlog warning message of a first type to the application 420. In response to the backlog exceeding the backlog threshold 432, the transport layer 425 can provide an warning message of different type to the application 420. Based on the type of received warning message, the application 420 can take different actions. For example, the application 420 can throttle the rate at which messages are provided for communication at a different rate based on the warning message type. Thus, based on the backlog thresholds 431-433, the transport layer 425 can provide different warning messages to indicate that a bottleneck is becoming progressively more likely, allowing the application 420 to take appropriate action.

Figure 5:
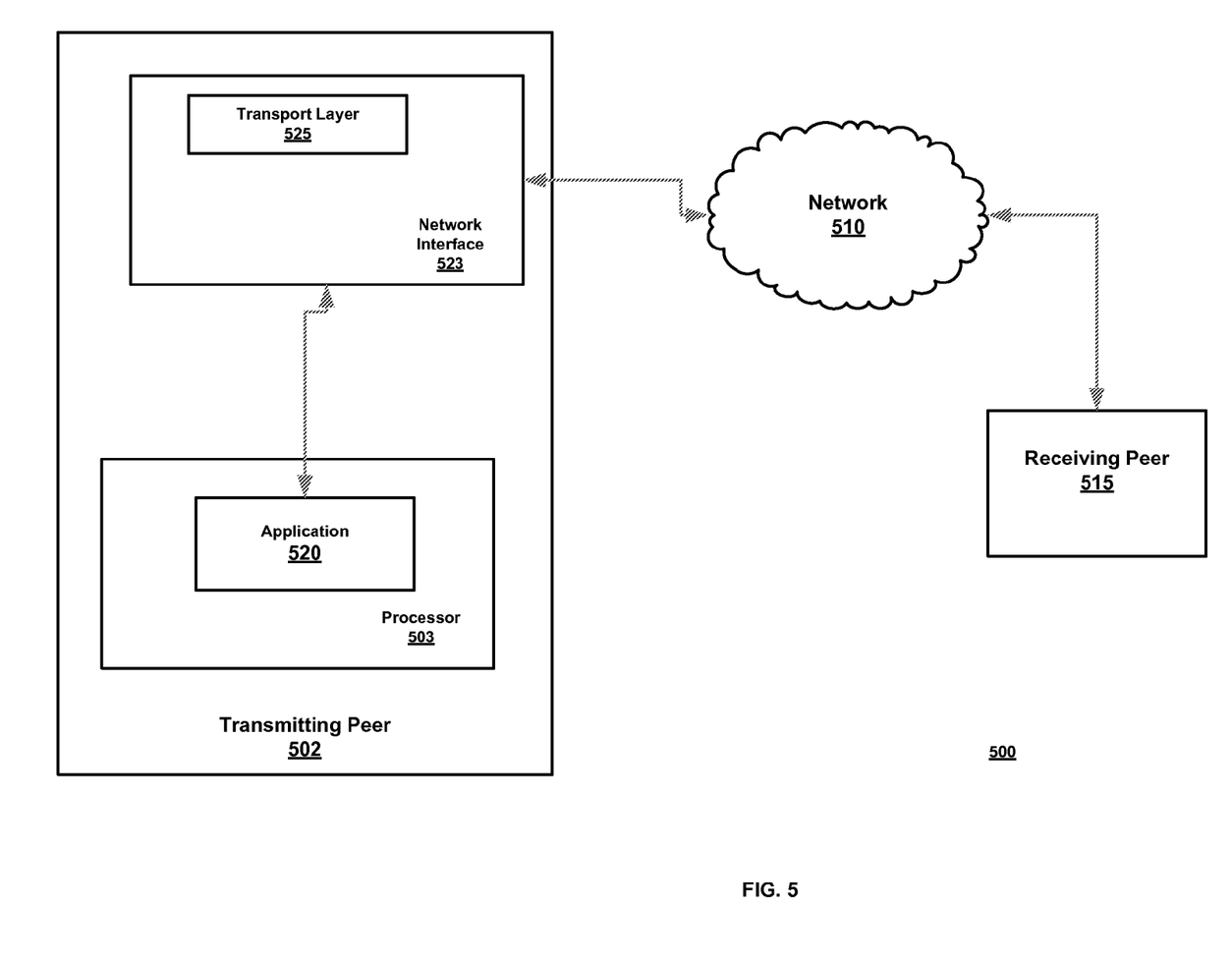
FIG. 5 is a block diagram of a communication network in accordance with another embodiment of the present disclosure.

FIG. 5 illustrates a communication network 500 in accordance with one embodiment of the present disclosure. The communication network 500 includes a transmitting peer 502, a network 510, and a receiving peer 515, each of which is connected and configured similarly to the corresponding items of FIG. 1. The transmitting peer 502 includes a processor 503 configured to execute the application 520 and also includes a network interface 523 configured to execute the transport layer 525. In an embodiment, the network interface 523 is a network interface device, such as a network interface card or processor, configured to provide a physical layer interface between the network 510 and the processor 503. The network interface 523 can be located in the same physical housing as the processor 503, but remote from it, such as on another card or integrated circuit die. The transport layer 525 can perform the flow control functions described herein. Thus, in the illustrated embodiment of FIG. 5 flow control functions can be implemented at the network interface 523, thereby reducing load at the processor 503 and improving communication bandwidth. In one embodiment, in response to a warning message from the transport layer 525, the processor 503 can be placed in a sleep mode or other reduced power state for a defined amount of time, thereby reducing resources while the network interface 523 continues to transmit packets, thereby clearing the potential bottleneck at transport layer 525.

Figure 6:
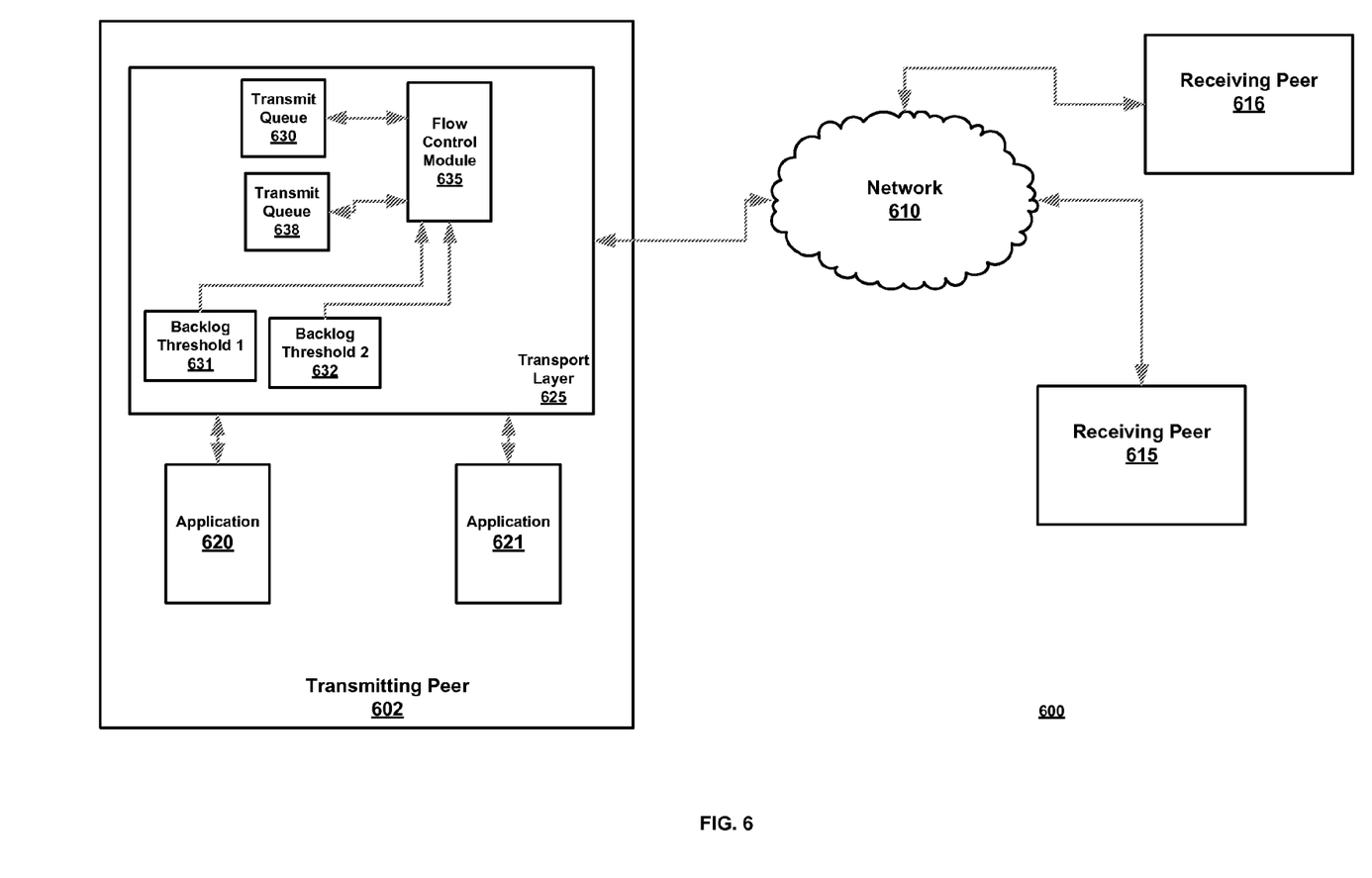
FIG. 6 is a block diagram of a communication network in accordance with another embodiment of the present disclosure.

FIG. 6 illustrates a communication network 600 in accordance with one embodiment of the present disclosure. The communication network 600 includes a transmitting peer 602, a network 610, and a receiving peer 615, each of which is connected and configured similarly to the corresponding items of FIG. 1. Communication network 600 also includes a receiving peer 616, which is configured similarly to receiving peer 615. The transmitting peer 602 includes applications 620 and 621, and transport layer 625. Transport layer 625 includes a flow control module 635, transmit queues 630 and 638, and backlog thresholds 631 and 632.

In operation, applications 620 and 621 can establish independent communication sessions with receiving peers 615 and 616 respectively. In response, transport layer 625 assigns memory space for each connection to establish transmit queues 630 and 638, respectively, for the corresponding communication session. Thus, transmit queue 630 is associated with the communication session between application 620 and receiving peer 615, while transmit queue 638 is associated with the communication session between application 621 and receiving peer 616. The transport layer 625 also establishes backlog thresholds for each communication session, illustrated as backlog thresholds 631 and 632, respectively. Specifically, transport layer 625 establishes the backlog threshold 631 for the communication session between application 620 and receiving peer 615, while backlog threshold 632 is established for the communication session between application 621 and receiving peer 616.

The transport layer 625 receives messages from each of the applications 620 and 621 and stores each received message in the associated transmit queue. As the messages are retired (in response to an acknowledgement from the associated receiving peer), they are removed from the respective queue. When the number of stored messages at a transmit queue reaches the associated backlog threshold, the transport layer 625 provides a warning message to the associated application. Thus, in the illustrated embodiment of FIG. 6, the transport layer 625 provides bottleneck warnings for each established communication session. Further, the backlog threshold for each session can be different, allowing for flexible management of transport layer resources.

It will be appreciated that the methods disclosed herein can be performed by a computer program stored on a computer readable medium that tangibly embodies the program. The computer program can include instructions to manipulate a processor to perform one or more of the methods described herein.

The above disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
    obtaining a first message at a transport layer of a communication device from a first application being executed at the communication device;
    comparing an amount of data stored in a first queue at the transport layer with a first threshold value;
    determining at the transport layer a first potential communication bottleneck associated with a target node of the first message in response to determining the amount of data stored in the first queue at the transport layer exceeds the first threshold value;
    in response to determining the first potential communication bottleneck,
        providing a first warning message from the transport layer to the first application indicating a reduced amount of transmission resources available at the transport layer to cause the first application to reduce a rate of communicating messages to the transport layer by a first predefined amount, wherein the first predefined amount is associated with the first threshold value;
        obtaining subsequent messages at the transport layer from the first application at the reduced rate of message communication determined based on the first warning message;
    determining at the transport layer a second potential communication bottleneck associated with the target node based on a comparison of the amount of data stored at the first queue with a second threshold value, the second threshold value different from the first threshold value;
    in response to determining the second potential communication bottleneck,
        providing a second warning message from the transport layer to the first application to cause the first application to reduce the rate of communicating messages to the transport layer by a second predefined amount, wherein the second predefined amount is associated with the second threshold value, and the second predefined amount is different from the first predefined amount; and
        obtaining subsequent messages at the transport layer from the first application at the reduced rate of message communication determined based on the second warning message.

2. The method of claim 1, further comprising:
    determining the first threshold value based on a request from the first application.

3. The method of claim 1, further comprising:
    determining the first threshold value based on a request from the target node.

4. The method of claim 1, wherein the type of the first warning message is different than the type of the second warning message.

5. The method of claim 1, wherein the first threshold value is indicative of an amount of data less than a size of the first queue.

6. The method of claim 1, wherein obtaining the first message comprises obtaining the first message from a first processor executing the first application, and wherein the transport layer is executed at a network interface device of the communication device different from the first processor of the communication device, the network interface device configured to provide an interface between the first processor and a network external to the communication device.

7. A method comprising:
    obtaining a first message at a transport layer of a communication device from a first application being executed at the communication device;
    comparing an amount of data stored in a first queue at the transport layer with a first threshold value;
    determining at the transport layer a first potential communication bottleneck associated with a target node of the first message in response to determining the amount of data stored in the first queue at the transport layer exceeds the first threshold value;
    in response to determining the first potential communication bottleneck associated with the target node of the first message,
        providing a first warning message from the transport layer to the first application indicating a reduced amount of transmission resources available at the transport layer to cause the first application to reduce a rate of communicating messages to the transport layer;
        obtaining subsequent messages at the transport layer from the first application at the reduced rate of message communication determined based on the first warning message;
    obtaining a second message at the transport layer from a second application;
    determining at the transport layer a second potential communication bottleneck associated with a target node of the second message, the target node of the second message different than the target node of the first message;
    in response to determining the second potential communication bottleneck associated with the target node of the second message,
        providing a second warning message from the transport layer to the second application indicating a reduced amount of transmission resources available at the transport layer to cause the second application to reduce a rate of communicating messages to the transport layer; and
        obtaining subsequent messages at the transport layer from the second application at the reduced rate of message communication associated with the second warning message that is different that the reduced rate of message communication associated with the first warning message.

8. The method of claim 7, wherein determining the second potential communication bottleneck comprises:
    comparing an amount of data stored in a second queue at the transport layer with a second threshold value; and
    determining the second potential communication bottleneck in response to determining the amount of data stored in the second queue at the transport layer exceeds the second threshold value.

9. The method of claim 8, wherein the first threshold value is different than the second threshold value.

10. A network device, comprising:
    a processor operable to execute a first application; and
    a network interface device coupled with the processor, the network interface device operable to:
        obtain a first message at a transport layer from the first application executing at the processor;
        compare an amount of data stored in a first queue at the transport layer with a first threshold value;
        determine at the transport layer a first potential communication bottleneck associated with a target node of the first message in response to determining the amount of data stored in the first queue at the transport layer exceeds the first threshold value;

in response to determining the first potential communication bottleneck,
provide a first warning message from the transport layer to the first application to cause the first application to reduce a rate of communicating messages to the transport layer by a first predefined amount, wherein the first predefined amount is associated with the first threshold value;
transmit the first message to the target node via a network external to the network device; and
obtain subsequent messages at the transport layer from the first application at the reduced rate of message communication determined based on the first warning message;
determine at the transport layer a second potential communication bottleneck associated with the target node based on a comparison of the amount of data stored at the first queue with a second threshold value, the second threshold value different from the first threshold value;
in response to determining the second potential communication bottleneck,
provide a second warning message from the transport layer to the first application to cause the first application to reduce the rate of communicating messages to the transport layer by a second predefined amount, wherein the second predefined amount is associated with the second threshold value, and the second predefined amount is different from the first predefined amount; and
obtain subsequent messages at the transport layer from the first application at the reduced rate of message communication determined based on the second warning message.

11. The network device of claim 10, wherein the network interface device is operable to:
determine the first threshold value based on a request from the first application.

12. The network device of claim 10, wherein the network interface device is operable to:
determine the first threshold value based on a request from the target node.

13. The network device of claim 10, wherein the type of the first warning message is different than the type of the second warning message.

14. A network device comprising:
a processor operable to execute a first application and a second application; and
a network interface device coupled with the processor, the network interface device operable to:
obtain a first message at a transport layer from a first application being executed at the processor;
compare an amount of data stored in a first queue at the transport layer with a first threshold value;
determine at the transport layer a first potential communication bottleneck associated with a target node of the first message in response to determining the amount of data stored in the first queue at the transport layer exceeds the first threshold value;
in response to determining the first potential communication bottleneck associated with the target node of the first message,
provide a first warning message from the transport layer to the first application indicating a reduced amount of transmission resources available at the transport layer to cause the first application to reduce a rate of communicating messages to the transport layer;
obtain subsequent messages at the transport layer from the first application at the reduced rate of message communication determined based on the first warning message;
obtain a second message at the transport layer from a second application being executed at the processor;
determine at the transport layer a second potential communication bottleneck associated with a target node of the second message, the target node of the second message different than the target node of the first message;
in response to determining the second potential communication bottleneck associated with the target node of the second message,
provide a second warning message from the transport layer to the second application indicating a reduced amount of transmission resources available at the transport layer to cause the second application to reduce a rate of communicating messages to the transport layer; and
obtain subsequent messages at the transport layer from the second application at the reduced rate of message communication associated with the second warning message that is different that the reduced rate of message communication associated with the first warning message.

15. A network device, comprising:
a processor operable to execute a first application; and
a network interface device coupled with the processor, the network interface device operable to:
obtain a first message at a transport layer from the first application executing at the processor;
compare an amount of data stored in a first queue at the transport layer with a plurality of backlog thresholds in response to obtaining the first message;
determine at the transport layer a potential communication bottleneck associated with a target node of the first message in response to determining the amount of data stored in the first queue at the transport layer exceeds at least one of the plurality of backlog thresholds;
in response to determining the potential communication bottleneck at the transport layer,
select a type of warning message from a plurality of types of warning messages based on which one or more of the plurality of backlog thresholds were exceeded;
provide the selected type of warning message from the transport layer to the first application to cause the first application to reduce a rate of communicating messages to the transport layer, wherein an amount the first application reduces the rate of communicating messages to the transport layer is determined based on the type of warning message received by the first application;
send the first message to the target node via a network external to the network device; and
in response to providing the selected type of warning message to the first application, obtain subsequent messages at the transport layer from the first application at the reduced rate of message communication dependent on the selected type of warning message.

16. The network device of claim 15, wherein the network interface device is operable to:

compare the amount of data stored in the first queue at the transport layer with at least a first backlog threshold and a second backlog threshold in response to obtaining the first message;

determine at the transport layer the potential communication bottleneck in response to determining the amount of data stored in the first queue at the transport layer exceeds at least one of the first backlog threshold and the second backlog threshold;

in response to determining the amount of data stored in the first queue at the transport layer exceeds the first backlog threshold, select a first type of warning message from the plurality of types of warning messages;

provide the first type of warning message from the transport layer to the first application to cause the first application to begin communicating messages to the transport layer at a first reduced rate of message communication; and in response to determining the amount of data stored in the first queue at the transport layer exceeds the first and second backlog thresholds, select a second type of warning message from the plurality of types of warning messages; and provide the second type of warning message from the transport layer to the first application to cause the first application to begin communicating messages to the transport layer at a second reduced rate of message communication that is less than the first reduced rate of message communication.

17. The network device of claim 15, wherein the network interface device is operable to:

determine the plurality of backlog thresholds based on a request from the first application.

18. The network device of claim 15, wherein the network interface device is operable to:

determine the plurality of backlog thresholds based on a request from the target node.

19. A method comprising:

obtaining a first message at a transport layer of a communication device from a first application being executed at the communication device;

comparing an amount of data stored in a first queue at the transport layer with a plurality of backlog thresholds in response to obtaining the first message;

determining at the transport layer a potential communication bottleneck associated with a target node of the first message in response to determining the amount of data stored in the first queue at the transport layer exceeds at least one of the plurality of backlog thresholds;

in response to determining the potential communication bottleneck at the transport layer, selecting a type of warning message from a plurality of types of warning messages based on which one or more of the plurality of backlog thresholds were exceeded;

providing the selected type of warning message from the transport layer to the first application to cause the first application to reduce a rate of communicating messages to the transport layer, wherein an amount the first application reduces the rate of communicating messages to the transport layer is determined based on the type of warning message received by the first application; and in response to providing the selected type of warning message to the first application, obtaining subsequent messages at the transport layer from the first application at the reduced rate of message communication dependent on the selected type of warning message.

20. The method of claim 19, further comprising:

comparing the amount of data stored in the first queue at the transport layer with at least a first backlog threshold and a second backlog threshold in response to obtaining the first message;

determining at the transport layer the potential communication bottleneck in response to determining the amount of data stored in the first queue at the transport layer exceeds at least one of the first backlog threshold and the second backlog threshold;

in response to determining the amount of data stored in the first queue at the transport layer exceeds the first backlog threshold, selecting a first type of warning message from the plurality of types of warning messages;

providing the first type of warning message from the transport layer to the first application to cause the first application to begin communicating messages to the transport layer at a first reduced rate of message communication; and in response to determining the amount of data stored in the first queue at the transport layer exceeds the first and second backlog thresholds, selecting a second type of warning message from the plurality of types of warning messages; and providing the second type of warning message from the transport layer to the first application to cause the first application to begin communicating messages to the transport layer at a second reduced rate of message communication that is less than the first reduced rate of message communication.

21. A non-transitory machine-readable storage media having instructions stored therein, which when executed by one or more processors causes the one or more processors to perform operations that comprise:

obtaining a first message at a transport layer of a communication device from a first application being executed at the communication device;

comparing an amount of data stored in a first queue at the transport layer with a plurality of backlog thresholds in response to obtaining the first message;

determining at the transport layer a potential communication bottleneck associated with a target node of the first message in response to determining the amount of data stored in the first queue at the transport layer exceeds at least one of the plurality of backlog thresholds;

in response to determining the potential communication bottleneck at the transport layer, selecting a type of warning message from a plurality of types of warning messages based on which one or more of the plurality of backlog thresholds were exceeded;

providing the selected type of warning message from the transport layer to the first application to cause the first application to reduce a rate of communicating messages to the transport layer, wherein an amount the first application reduces the rate of communicating messages to the transport layer is determined based on the type of warning message received by the first application; and in response to providing the selected type of warning message to the first application, obtaining subsequent messages at the transport layer from the first application at the reduced rate of message communication dependent on the selected type of warning message.

22. The non-transitory computer readable storage media of claim 21, wherein the operations further comprise:
- comparing the amount of data stored in the first queue at the transport layer with at least a first backlog threshold and a second backlog threshold in response to obtaining the first message;
- determining at the transport layer the potential communication bottleneck in response to determining the amount of data stored in the first queue at the transport layer exceeds at least one of the first backlog threshold and the second backlog threshold;
- in response to determining the amount of data stored in the first queue at the transport layer exceeds the first backlog threshold,
    - selecting a first type of warning message from the plurality of types of warning messages;
    - providing the first type of warning message from the transport layer to the first application to cause the first application to begin communicating messages to the transport layer at a first reduced rate of message communication; and
- in response to determining the amount of data stored in the first queue at the transport layer exceeds the first and second backlog thresholds,
    - selecting a second type of warning message from the plurality of types of warning messages; and
    - providing the second type of warning message from the transport layer to the first application to cause the first application to begin communicating messages to the transport layer at a second reduced rate of message communication that is less than the first reduced rate of message communication.

* * * * *